United States Patent
Smith et al.

(10) Patent No.: US 9,908,643 B2
(45) Date of Patent: Mar. 6, 2018

(54) PASSIVE THERMAL SYSTEM PROVIDING AN EMBEDDED INTERFACE FOR HEAT PIPES

(71) Applicant: WorldVu Satellites Limited, St Helier, Jersey (GB)

(72) Inventors: Alexander D. Smith, San Jose, CA (US); Armen Askijian, Sunnyvale, CA (US); Daniel W. Field, Sunnyvale, CA (US); James Grossman, Sunnyvale, CA (US)

(73) Assignee: WorldVu Satellites Limited, Arlington, VA (US)

( * ) Notice: Subject to any disclaimer, the term of this patent is extended or adjusted under 35 U.S.C. 154(b) by 0 days.

(21) Appl. No.: 14/818,600

(22) Filed: Aug. 5, 2015

(65) Prior Publication Data
US 2017/0036786 A1    Feb. 9, 2017

(51) Int. Cl.
*B64G 1/52*    (2006.01)
*B64G 1/58*    (2006.01)
(Continued)

(52) U.S. Cl.
CPC .............. *B64G 1/58* (2013.01); *B64G 1/1007* (2013.01); *F28D 15/0275* (2013.01)

(58) Field of Classification Search
CPC . B23P 19/04; B23P 15/26; B64C 1/12; B64C 1/064; F28F 19/00; F28F 21/04;
(Continued)

(56) References Cited

U.S. PATENT DOCUMENTS

| | | | | |
|---|---|---|---|---|
| 4,324,375 A | * | 4/1982 | O'Neill | B64G 1/50 165/104.14 |
| 5,036,905 A | * | 8/1991 | Eninger | B64G 1/50 165/104.26 |

(Continued)

FOREIGN PATENT DOCUMENTS

EP    1468911 A1  *  10/2004  ............. B64G 1/503

OTHER PUBLICATIONS

Authorized Officer: Lee W. Young, "International Search Report" dated Nov. 28, 2016 in PCT International Application PCT/US16/45675 Published in: US.

(Continued)

*Primary Examiner* — Assres H Woldemaryam
(74) *Attorney, Agent, or Firm* — Kaplan Breyer Schwarz, LLP

(57) ABSTRACT

A passive thermal system for use in aerospace vehicles includes a first passive thermal panel having at least one internal resident heat pipe, wherein the first passive thermal panel is further configured to provide an embedded interface between a portion of the resident heat pipe and at least one heat pipe extending from a neighboring passive thermal panel. The embedded interface is facilitated via an internal channel that is adjacent to the internal resident heat pipe. The channel is dimensioned and arranged to receive a portion of a heat pipe extending from a passive thermal panel that will be situated adjacent to the first passive thermal panel. The embedded interface is also facilitated by an arrangement that imparts a compressive force to the non-resident heat pipe that urges it against the resident heat pipe.

16 Claims, 8 Drawing Sheets

(51) Int. Cl.
  *F28D 15/02* (2006.01)
  *B64G 1/10* (2006.01)
(58) Field of Classification Search
  CPC ........ F28F 21/084; F28F 21/085; F28F 3/027;
     F28F 19/002; F28F 1/10; F28F 1/126;
     F28F 1/128; F28F 1/22; F28F 1/32; F28F
     1/40; B64G 1/58; B64G 1/1007
  See application file for complete search history.

(56) References Cited

U.S. PATENT DOCUMENTS

| | | | | |
|---|---|---|---|---|
| 5,699,982 | A * | 12/1997 | Daugherty | B64G 1/503 |
| | | | | 165/41 |
| 5,732,765 | A * | 3/1998 | Drolen | B64G 1/50 |
| | | | | 165/41 |
| 5,743,325 | A * | 4/1998 | Esposto | B64G 1/22 |
| | | | | 165/41 |
| 5,806,800 | A * | 9/1998 | Caplin | B64G 1/503 |
| | | | | 165/41 |
| 5,806,803 | A | 9/1998 | Watts | |
| 6,478,258 | B1 * | 11/2002 | Yee | B64G 1/503 |
| | | | | 165/41 |
| 6,776,220 | B1 * | 8/2004 | Low | B64G 1/506 |
| | | | | 165/104.33 |
| 8,910,701 | B2 * | 12/2014 | Torres Sep Iveda | B64G 1/50 |
| | | | | 165/103 |
| 2002/0145082 | A1 * | 10/2002 | Bertheux | B64G 1/503 |
| | | | | 244/172.6 |
| 2004/0040691 | A1 * | 3/2004 | Jacque | F28D 15/043 |
| | | | | 165/42 |
| 2008/0217483 | A1 * | 9/2008 | Hugon | B64G 1/503 |
| | | | | 244/171.8 |
| 2008/0257525 | A1 * | 10/2008 | Ohnishi | B64G 1/506 |
| | | | | 165/41 |
| 2010/0243817 | A1 * | 9/2010 | McKinnon | B64G 1/50 |
| | | | | 244/171.8 |

OTHER PUBLICATIONS

Authorized Officer: Lee W. Young, "Written Opinion of the International Searching Authority" dated Nov. 28, 2016 in PCT International Application PCT/US16/45675 Published in: US.

* cited by examiner

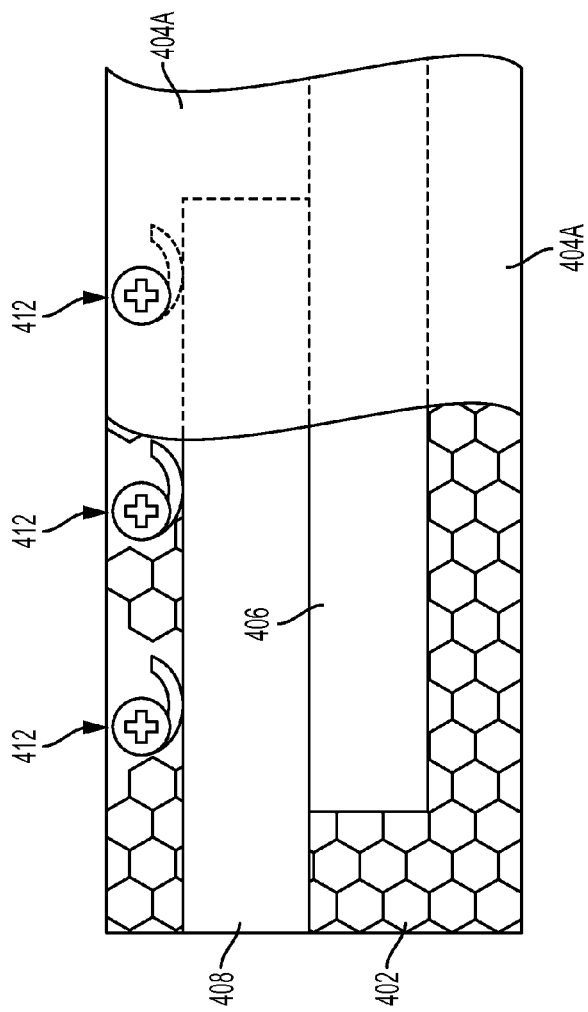
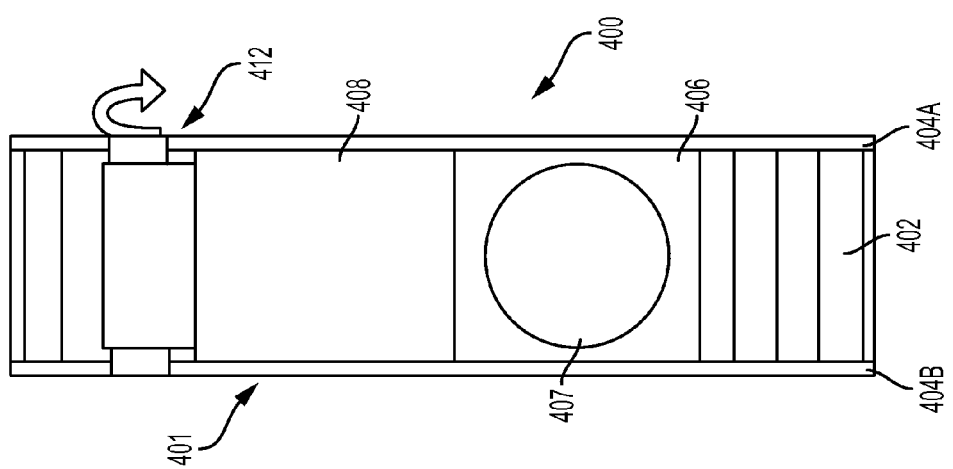
FIG. 4B
FIG. 4A

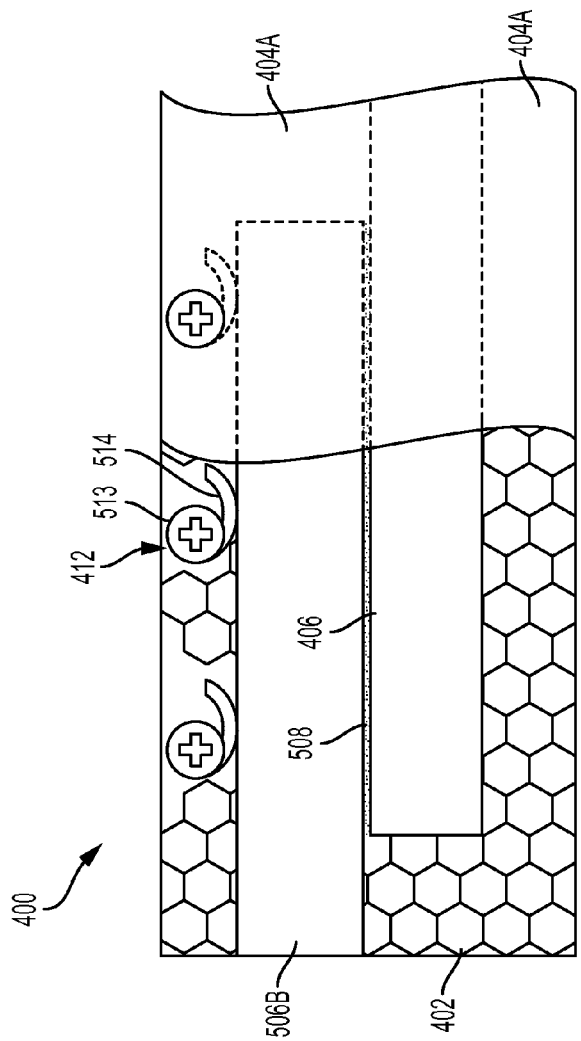
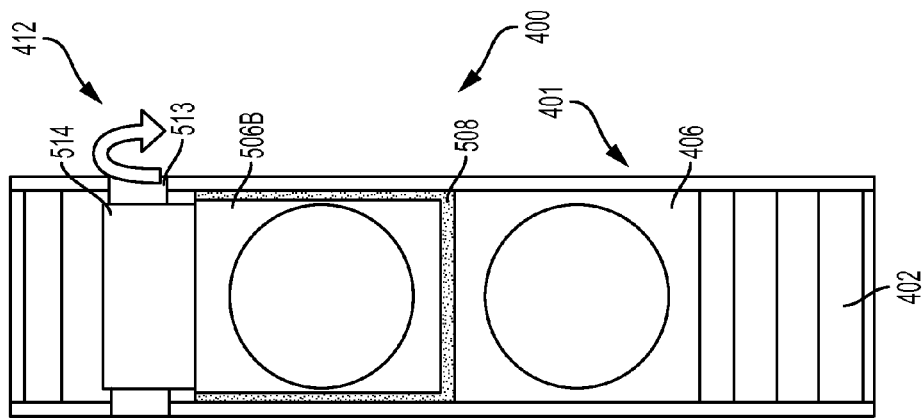
FIG. 5D
FIG. 5C

PASSIVE THERMAL SYSTEM PROVIDING AN EMBEDDED INTERFACE FOR HEAT PIPES

FIELD OF THE INVENTION

The present invention relates to earth-orbiting communication satellites.

BACKGROUND OF THE INVENTION

Communication satellites receive and transmit radio signals from and to the surface of the Earth. Although Earth-orbiting communications satellites have been in use for many years, providing adequate cooling and heat distribution for the thermally sensitive electronics components onboard such satellites continues to be a problem.

There are two primary sources of heat with which a satellite's thermal systems must contend. One source is solar radiation. Solar radiation can be absorbed by thermal insulation shields or readily reflected away from the satellite by providing the satellite with a suitably reflective exterior surface. A second source of heat is the electronics onboard the satellite. The removal of electronics-generated heat is more problematic since such heat must be collected from various locations within the satellite, transported to a site at which it can be rejected from the satellite, and then radiated into space.

Passive thermal panels can be used to dissipate heat from satellites. In one configuration, the passive thermal panel includes a lightweight honeycomb core that is sandwiched between two thin, stiff panels or "skins".

These thermal panels typically have "heat pipes" embedded therein. The use of internal heat pipes enables components to be mounted on the surface of the panels. Well known in the art, the heat pipe is a closed chamber, typically in the form of tube, having an internal capillary structure which is filled with a working fluid. The operating-temperature range of the satellite sets the choice of working fluid; ammonia, ethane and propylene are typical choices. Heat input (i.e., from heat-generating electronics) causes the working fluid to evaporate. The evaporated fluid carries the heat towards a colder heat-output section, where heat is rejected as the fluid condenses. The rejected heat is absorbed by the cooler surfaces of the heat-output section and then radiated into space. The condensate returns to the heat input section (near to heat-generating components) by capillary forces to complete the cycle.

When two mechanically independent passive thermal panels need to be thermally coupled, such as to move heat from one panel to the next, an external "jumper" or thermal strap is used. The jumper, which is a segment of heat pipe disposed on the outside of the panel, provides a bridge to thermally couple the heat pipes within the adjacent panels. The jumper is coupled to the one of the panels via a bolted interface.

FIGS. 3A and 3B depict, via respective cross-sectional and top views, an arrangement in the prior art showing jumper heat pipe 386 with bolted interface 390 attached to passive thermal panel 301. FIG. 3A depicts passive thermal panel 300 having honeycomb core 370 and skins 372A and 372B. Heat pipe 380 is disposed within panel 301. Heat pipe 380 includes conduit 382, which contains working fluid, and flanged region 384. Jumper heat pipe 386 is bolted to the exterior of passive thermal panel 301. Jumper heat pipe 386 includes conduit 388, which contains working fluid, and flanged region 390.

In this illustration, bolts 392 extend through flanged region 384 of embedded heat pipe 380 and through flanged region 390 of jumper heat pipe 386. Nuts 394 lock the bolts to the flanges, thereby attaching jumper heat pipe 386 to panel 301.

Thermal interface material 396 is used between flanged region 384 of embedded heat pipe 380 and flanged region 390 of jumper heat pipe 386 to improve heat transfer across these surfaces. The jumper heat pipe is coupled in the same fashion to an adjacent passive thermal panel (not shown). In this manner, heat can be transferred from one passive thermal panel to an adjacent panel.

It will be appreciated from FIGS. 3A and 3B that the presence of the jumper and bolted interface prevents other components from being mounted to the panel at those locations.

SUMMARY OF THE INVENTION

The present invention provides an improved passive thermal system that avoids some of the drawbacks of the prior art. Unlike prior arrangements wherein heat is conveyed between adjacent passive thermal panels externally (via a jumper heat pipe), embodiments of the present invention provide a way to transfer heat internally between adjacent panels. As a consequence, no external panel real estate is used, leaving the outside surface of the panels free for component mountings, etc.

A passive thermal system in accordance with the illustrative embodiment includes a first passive thermal panel having at least one internal resident heat pipe, wherein the first passive thermal panel is further configured to provide an embedded interface between a portion of the resident heat pipe and at least one heat pipe extending from a neighboring passive thermal panel (a "non-resident" heat pipe).

The embedded interface is facilitated via an internal channel that is adjacent to the internal heat pipe. The channel is dimensioned and arranged to receive a portion of a non-resident heat pipe extending from a passive thermal panel that will be situated adjacent to the first passive thermal panel. The embedded interface is also facilitated by an arrangement that imparts a compressive force to the non-resident heat pipe (once received by the channel) that urges it against the resident heat pipe.

In addition to freeing-up external real estate on passive thermal panels, the present invention enables the heat pipes from multiple passive thermal panels to be thermally coupled after the panels are manufactured.

BRIEF DESCRIPTION OF THE DRAWINGS

FIG. 4A depicts a cross-sectional view of a passive thermal system in accordance with the illustrative embodiment of the present invention.

FIG. 4B depicts a top view of the passive thermal system of FIG. 4A (top skin partially removed).

FIG. 5C depicts, via a cross-sectional view, the passive thermal system of FIG. 4A with a non-resident heat pipe from an adjacent passive thermal panel disposed therein.

FIG. 5D depicts a top view of the passive thermal system of FIG. 5C (top skin partially removed).

DETAILED DESCRIPTION

Embodiments of the present invention can be used for all types of satellites (e.g., LEO, GEO, etc.) and other aerospace vehicles, as appropriate. Before addressing the specifics of the inventive passive thermal system for thermally coupling heat pipes from adjacent passive thermal panels, a satellite in which such a system can be used is described.

Satellite.

Figure 1:
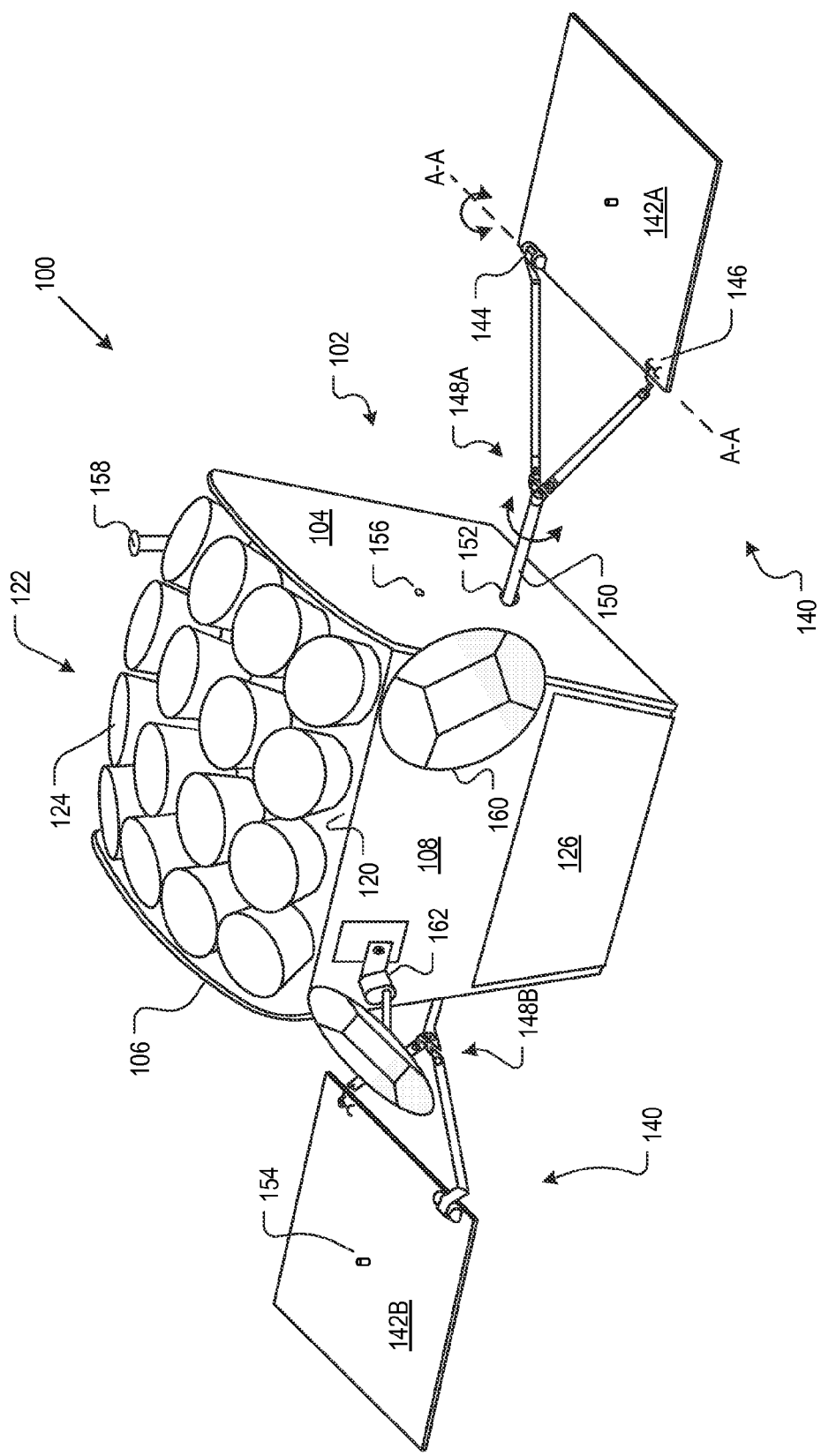
FIG. 1 depicts a satellite in accordance with the present teachings.
Figure 2:
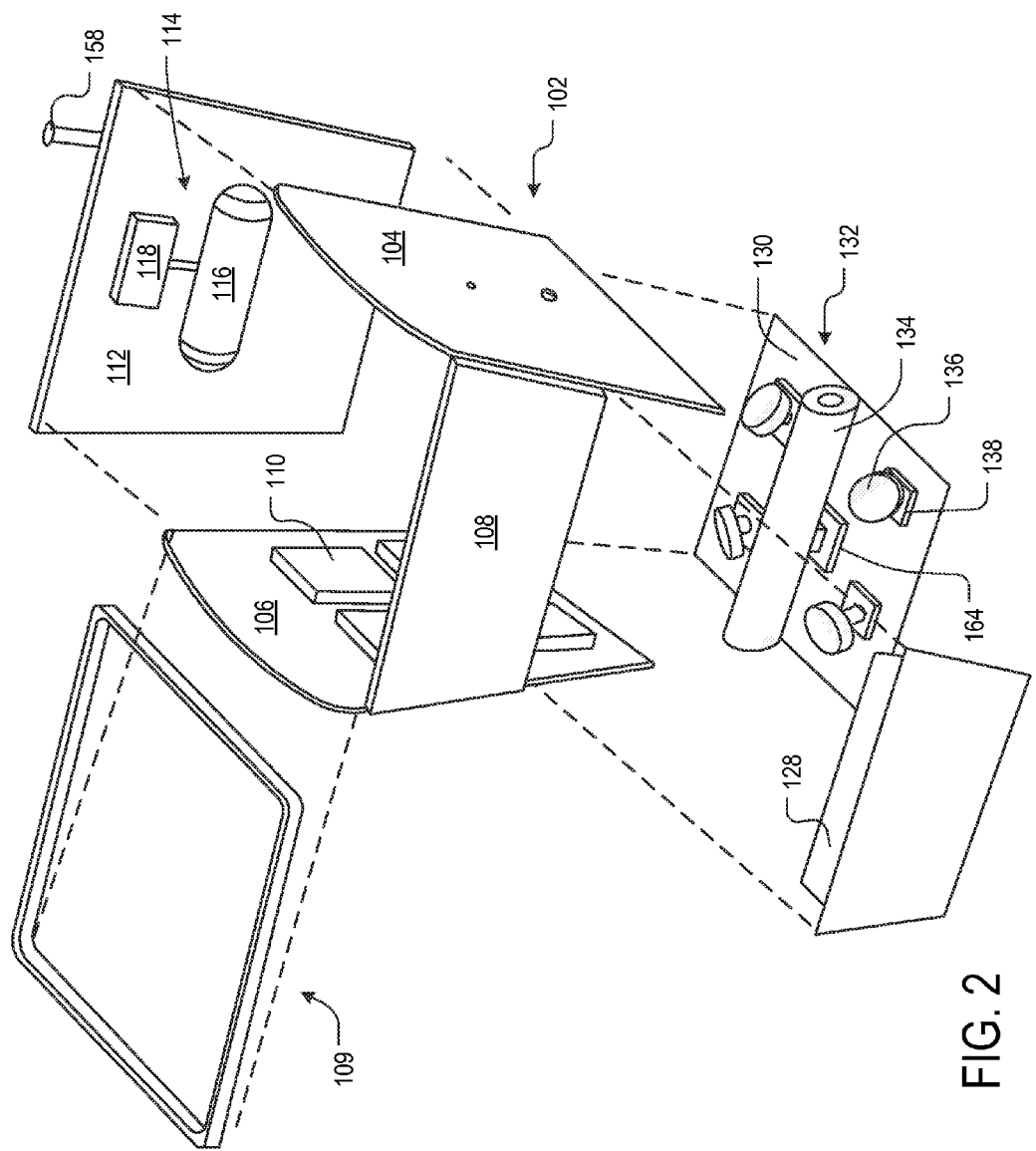
FIG. 2 depicts an exploded view of portions of the satellite of FIG. 1.
Figure 3A:
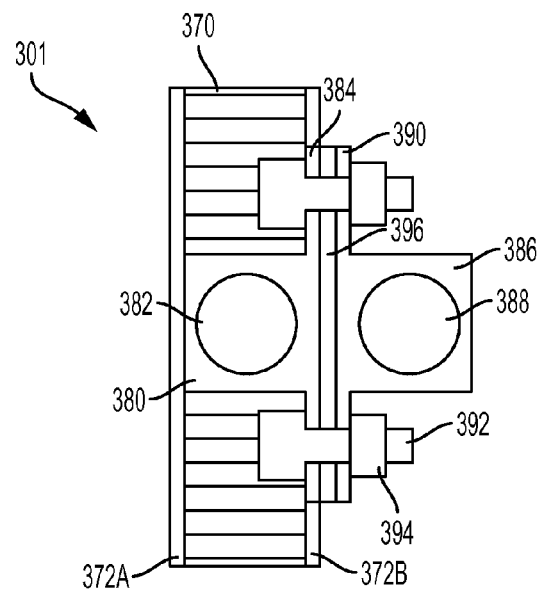
FIGS. 3A and 3B depict a prior-art jumper heat pipe and bolted interface.
Figure 3B:
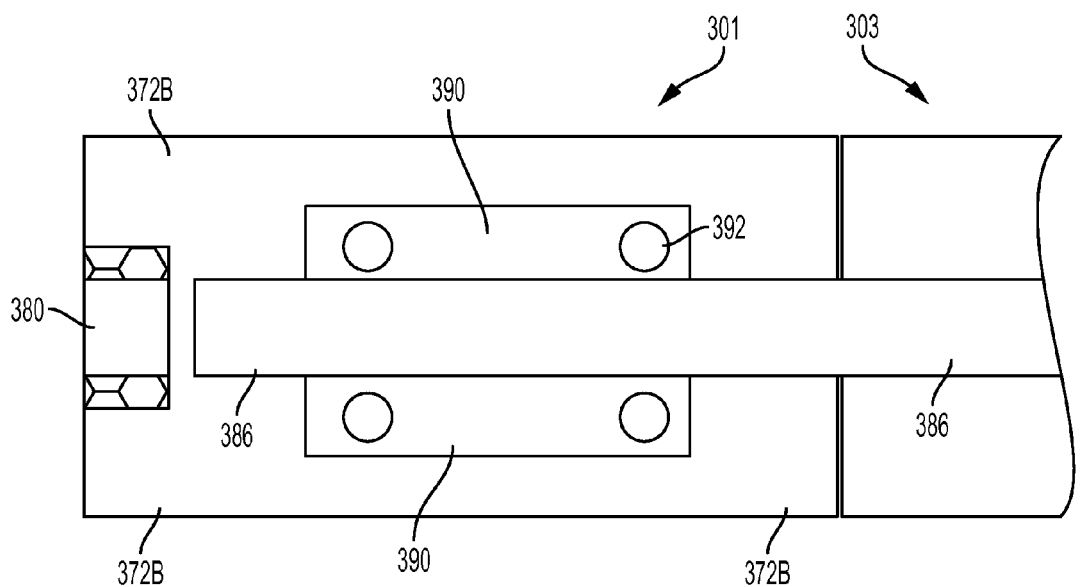

FIG. 1 depicts satellite 100 in accordance with the present teachings. FIG. 2 depicts an "exploded" view of some of the salient features of satellite 100. Referring now to both FIGS. 1 and 2, satellite 100 includes unified payload module 102, propulsion module 114, payload antenna module 122, bus component module 132, and solar-array system 140, arranged as shown. It is to be noted that the orientation of satellite 100 in FIGS. 1 and 2 is "upside down" in the sense that in use, antennas 124, which are facing "up" in the figures, would be facing "down" toward Earth.

Unified payload module 102 comprises panels 104, 106, and 108. In some embodiments, the panels are joined together using various connectors, etc., in known fashion. Brace 109 provides structural reinforcement for the connected panels.

Panels 104, 106, and 108 serve, among any other functionality, as radiators to radiate heat from satellite 102. In some embodiments, the panels include adaptations to facilitate heat removal. In some embodiments, the panels comprise plural materials, such as a core that is sandwiched by face sheets. Materials suitable for use for the panels include those typically used in the aerospace industry. For example, in some embodiments, the core comprises a lightweight aluminum honeycomb and the face sheets comprise 6061-T6 aluminum, which are bonded together, typically with an epoxy film adhesive.

Propulsion module 114 is disposed on panel 112, which, in some embodiments, is constructed in like manner as panels 104, 106, and 108 (e.g., aluminum honeycomb core and aluminum facesheets, etc.). Panel 112, which is obscured in FIG. 1, abuts panels 104 and 106 of unified payload module 102.

Propulsion module 114 includes fuel tank 116 and propulsion control system 118. The propulsion control system controls, using one or more valves (not depicted), release of propulsion gas through the propulsion nozzle (not depicted) that is disposed on the outward-facing surface of panel 114. Propulsion control system is appropriately instrumented (i.e., software and hardware) to respond to ground-based commands or commands generated onboard from the control processor.

Payload antenna module 122 comprises a plurality of antennas 124. In the illustrative embodiments, sixteen antennas 124 are arranged in a 4×4 array. In some other embodiments, antennas 124 can be organized in a different arrangement and/or a different number of antennas can be used. Antennas 124 are supported by support web 120. In some embodiments, the support web is a curved panel comprising carbon fiber, with a suitable number of openings (i.e., sixteen in the illustrative embodiment) for receiving and supporting antennas 124.

In some embodiments, antennas 124 transmit in the $K_u$ band, which is the 12 to 18 GHz portion of the electromagnetic spectrum. In the illustrative embodiment, antennas 124 are configured as exponential horns, which are often used for communications satellites. Well known in the art, the horn antenna transmits radio waves from (or collects them into) a waveguide, typically implemented as a short rectangular or cylindrical metal tube, which is closed at one end and flares into an open-ended horn (conical shaped in the illustrative embodiment) at the other end. The waveguide portion of each antenna 124 is obscured in FIG. 1. The closed end of each antenna 124 couples to amplifier(s) (not depicted in FIGS. 1 and 2; they are located on the interior surface of panel 104 or 108).

Bus component module 132 is disposed on panel 130, which attaches to the bottom (from the perspective of FIGS. 1 and 2) of the unified payload module 102. Panel 130 can be constructed in like manner as panels 104, 106, and 108 (e.g., aluminum honeycomb core and aluminum facesheets, etc.). In some embodiments, panel 130 does not include any specific adaptations for heat removal.

Module 132 includes main solar-array motor 134, four reaction wheels 136, and main control processor 164. The reaction wheels enable satellite 100 to rotate in space without using propellant, via conservation of angular momentum. Each reaction wheel 136, which includes a centrifugal mass (not depicted), is driven by an associated drive motor (and control electronics) 138. As will be appreciated by those skilled in the art, only three reaction wheels 136 are required to rotate satellite 100 in the x, y, and z directions. The fourth reaction wheel serves as a spare. Such reaction wheels are typically used for this purpose in satellites.

Main control processor 164 processes commands received from the ground and performs, autonomously, many of the functions of satellite 100, including without limitation, attitude pointing control, propulsion control, and power system control.

Solar-array system 140 includes solar panels 142A and 142B and respective y-bars 148A and 148B. Each solar panel comprises a plurality of solar cells (not depicted; they are disposed on the obscured side of solar panels 142A and 142B) that convert sunlight into electrical energy in known fashion. Each of the solar panels includes motor 144 and passive rotary bearing 146; one of the y-bar attaches to each solar panel at motor 144 and bearing 146. Motors 144 enable each of the solar panels to at least partially rotate about axis A-A. This facilitates deploying solar panel 142A from its stowed position parallel to and against panel 104 and deploying solar panel 142B from its stowed position parallel to and against panel 106. The motors 144 also function to appropriately angle panels 142A and 142B for optimal sun exposure via the aforementioned rotation about axis A-A.

Member 150 of each y-bar 148A and 148B extends through opening 152 in respective panels 104 and 106. Within unified payload module 102, members 150 connect to main solar-array motor 134, previously referenced in conjunction with bus component module 132. The main solar-array motor is capable of at least partially rotating each member 150 about its axis, as shown. This is for the purpose of angling solar panels 142A and 142B for optimal sun exposure. In some embodiments, the members 150 can be rotated independently of one another; in some other embodiments, members 150 rotate together. Lock-and-release member 154 is used to couple and release solar panel 142A to side panel 104 and solar panel 142B to side panel 106. The lock-and-release member couples to opening 156 in side panels 104 and 106.

Satellite 100 also includes panel 126, which fits "below" (from the perspective of FIGS. 1 and 2) panel 108 of unified payload module 102. In some embodiments, panel 108 is a sheet of aerospace grade material (e.g., 6061-T6 aluminum, etc.) Battery module 128 is disposed on the interior-facing surface of panel 126. The battery module supplies power for various energy consumers onboard satellite 100. Battery module 128 is recharged from electricity that is generated via solar panels 142A and 142B; the panels and module 128 are electrically coupled for this purpose (the electrical path between solar panels 142A/B and battery module 128 is not depicted in FIGS. 1 and 2).

Satellite 100 further includes omni-directional antenna 158 for telemetry and ground-based command and control.

Disposed on panel 108 are two "gateway" antennas 160. The gateway antennas send and receive user data to gateway stations on Earth. The gateway stations are in communication with the Internet. Antennas 160 are coupled to panel 108 by movable mounts 162, which enable the antennas to be moved along two axes for optimum positioning with ground-based antennas. Antennas 160 typically transmit and receive in the $K_a$ band, which covers frequencies in the range of 26.5 to 40 GHz.

Convertor modules 110, which are disposed on interior-facing surface of panel 106, convert between $K_a$ radio frequencies and $K_u$ radio frequencies. For example, convertor modules 110 convert the $K_a$ band uplink signals from gateway antennas 160 to $K_u$ band signals for downlink via antennas 124. Convertor modules 110 also convert in the reverse direction; that is, $K_u$ to $K_a$.

In operation of satellite 100, data flows as follows for a data request:
 (obtain data): requested data is obtained from the Internet at a gateway station;
 (uplink): a data signal is transmitted ($K_a$ band) via large, ground-based antennas to the satellite's gateway antennas 160;
 (payload): the data signal is amplified, routed to convertor modules 110 for conversion to downlink ($K_u$) band, and then amplified again;
 the payload signal is routed to payload antennas 124;
 (downlink): antennas 124 transmit the amplified, frequency-converted signal to the user's terminal.
When a user transmits (rather than requests) data, such as an e-mail, the signal follows the same path but in the reverse direction.

Passive Thermal System Providing an Embedded Interface for Heat Pipes.

FIGS. 4A and 4B depict respective cross-sectional and top views of passive thermal system 400 for providing an embedded interface for heat pipes in accordance with the illustrative embodiment of the present invention. One or more of panels 104, 106, and 108 of satellite 100 can be configured as a passive thermal system in accordance with the present teachings.

Passive thermal system 400 includes passive thermal panel 401 having core 402 and face sheets 404A and 404B. The passive thermal panel is conventional and well known to those skilled in the art. In the illustrative embodiment, core 402 is a lightweight aluminum honeycomb and face sheets 404A/B are aluminum, such as 6061-T6, 5052, 5056, etc. The face sheets are bonded to the core with an adhesive, such as an epoxy film adhesive. In the top view shown in FIG. 4B, only a portion of face sheet 404A is shown, such that a portion of underlying core 402 is revealed.

Heat pipe 406 is disposed within panel 401. Heat pipe 406 includes conduit 407, which contains working fluid, such as ammonia, ethane, propylene, etc. The working fluid is selected so that, under the conditions of its use, it changes phase between a liquid and a vapor. As is well known to those skilled in the art, heat pipes, such as heat pipe 406, include a wick structure, the purpose of which is move, via capillary action, the working fluid (when in liquid form) through the length of the heat pipe. Those skilled in the art will be able to design and use heat pipes for use in conjunction with embodiments of the present invention.

Heat pipe 406 is placed in panel 401 as the panel is being fabricated. To do so, a channel is formed (e.g., cut, etc.) in core 402 and heat pipe 406 is then situated in the channel. The channel can be formed any time before the second of the two face sheets is attached to core 402.

In accordance with the illustrative embodiment, passive thermal system 400 also includes, within passive thermal panel 401, "paired" channel 408 and arrangement 412 for applying a compressive force to a heat pipe sourced from an adjacent panel (hereinafter a "non-resident heat pipe") that is ultimately received by paired channel 408. A non-resident heat pipe is distinguished from a "resident" heat pipe, which is a heat pipe (or multiple heat pipes) that are situated in a passive thermal panel when the panel is fabricated.

Paired channel 408 is formed adjacent to the channel that accommodates resident heat pipe 406. In the embodiment depicted in FIG. 4C, channel 408 does not run the full length of panel 401 (resident heat pipe 406 and paired channel 408 are shown in "phantom" below face sheet 404A). That is because a sufficient rate of heat transfer between a non-resident heat pipe (which will ultimately be received in channel 408) and a resident heat pipe can be achieved with such "partial" overlap. (See e.g., FIG. 6; see also FIG. 7A, wherein paired channel 708A extends about 50-60% of the length of resident heat pipe 706). Those skilled in the art will be able to determine how much overlap there should be between a resident and a non-resident heat pipe to provide a desired rate of heat transfer therebetween. Other embodiments of configurations of a paired channel suitable for use in conjunction with the present invention are disclosed later in this specification in conjunction with a discussion of FIGS. 7B and 7C.

In some embodiments, a paired channel, such as paired channel 408, is formed for each resident heat pipe within a passive thermal panel. For example, if a passive thermal panel is fabricated to contain three (resident) heat pipes, in some embodiments, the panel will contain three accompanying paired channels. Each of the three paired channels will include arrangement 412 for applying a compressive force to a non-resident heat pipe (to be received by the paired channel).

Figure 5A:
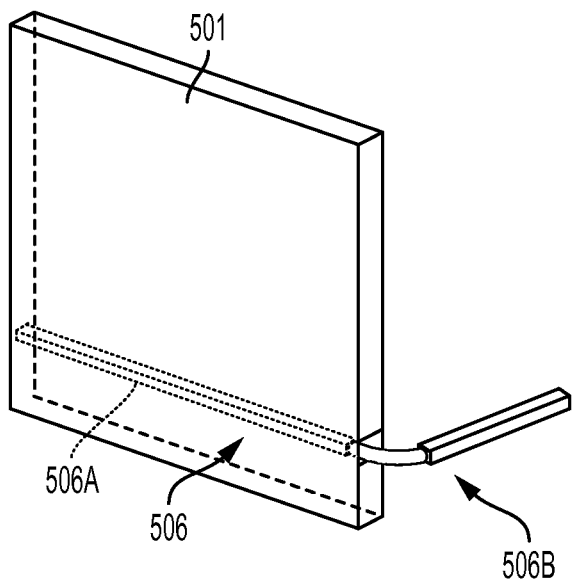
FIG. 5A depicts a first embodiment of a passive thermal panel having a heat pipe that extends outside of the panel.

The heat pipe from an adjacent passive thermal panel must be appropriately designed to be received by a paired channel, such as paired channel 408. FIG. 5A depicts an embodiment of a heat pipe suitable for being received by a paired channel. As depicted in FIG. 5A, heat pipe 506 has portions 506A and 506B. Portion 506A traverses substantially (at least about 90 percent of) the full length of panel 501.

Thus, portion 506A is considered to be a resident heat pipe of panel 501. Portion 506B is external to panel 501 (although in fluidic communication with internal portion 506A) and is therefore available to be received by the paired channel of an adjacent passive thermal panel in accordance with the present teachings.

Figure 6:
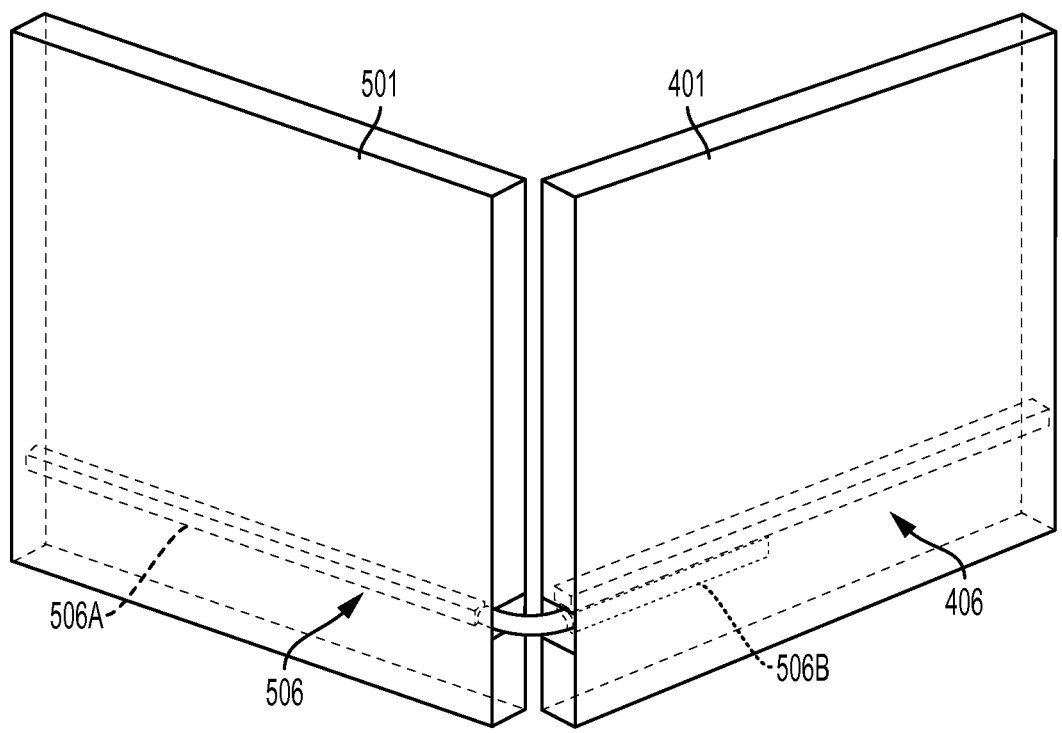
FIG. 6 depicts an embodiment of a passive thermal system including two passive thermal panels, wherein a first panel includes a heat pipe that extends beyond the first panel, and wherein the second panel receives the portion of the heat pipe that extends beyond the first panel, in accordance with the illustrative embodiment of the present invention.
Figure 7A:
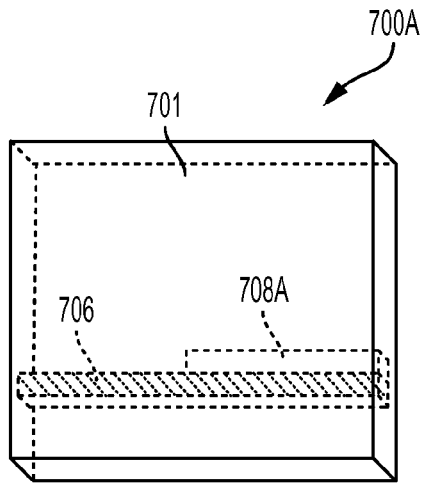
FIGS. 7A-7C depict some alternative embodiments of a passive thermal system in accordance with the present teachings.

Thus, portion 506B of heat pipe 506 is (potentially) a non-resident heat pipe (for an adjacent passive thermal panel). See, for example, FIG. 6 wherein portion 506B of heat pipe 506 of panel 501 is received by neighboring panel 401. Thus, from the "perspective" of panel 401, portion 506B of heat pipe 506 is a non-resident heat pipe. As depicted in FIG. 6, portion 506B partially traverses panel 401, abutting a portion of resident heat pipe 406. For clarity, a gap is shown between panels 401 and 501; typically, two such adjacent panels would abut one another and no portion of the heat pipe 506 would be visible from the exterior of the panels.

In the embodiment depicted in FIG. 5A, portion 506B of heat pipe 506 is co-linear with portion 506A. As such, the paired channel that is intended to receive portion 506B (as a non-resident heat pipe) must be situated at same "elevation" in its respective passive thermal panel. In other words, to the extent that there are resident heat pipes present in two neighboring passive thermal panels, and to the extent that one of the panels will be receiving a portion of the heat pipe from the adjacent thermal panel, the resident heat pipes within the two neighboring panels must be at different elevations. This can be seen in FIG. 6, wherein resident heat pipe 406 in panel 401 is disposed at a higher "elevation" than resident heat pipe 506A of panel 501.

Figure 5B:
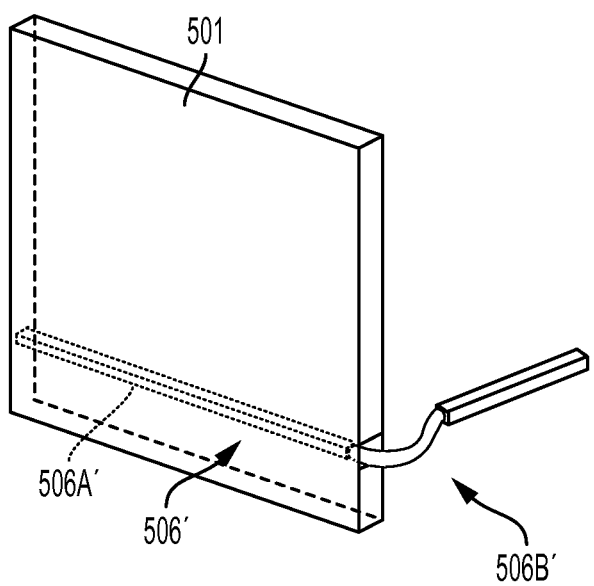
FIG. 5B depicts a second embodiment of a passive thermal panel having a heat pipe that extends outside of the panel.

In some alternative embodiments, to "standardize" the design of passive thermal panels that are being used in conjunction with the present invention, the portion of a heat pipe that extends beyond a first passive thermal panel (for use as a non-resident heat pipe) is not co-linear with respect to the portion of the heat pipe that is resident within the first passive thermal panel. Such an embodiment is depicted in FIG. 5B wherein portion 506B' of heat pipe 506' is upwardly curved such that portion 506A' within panel 501 and portion 506B' external to panel 501 are not co-linear. As a consequence, a neighboring passive thermal panel that is intended to receive portion 506B' in a paired channel can have its resident heat pipe at the same relative elevation as that of portion 506A' within panel 501.

It is notable that for the embodiment depicted in FIG. 6, resident heat pipe 406 terminates at the edge of panel 401 nearest panel 501. In some other embodiments (not depicted), heat pipe 406 has a portion that extends beyond the edge of panel 401 and is received by a paired channel that would be formed in panel 501. In such an embodiment, a portion of heat pipe 406 becomes a non-resident heat pipe, which is received by panel 501. And in either the illustrative embodiment or the other embodiments referenced above, the opposite end of resident heat pipe 406 can include a portion that extends beyond the other edge of panel 401 to facilitate heat exchange with another passive thermal panel (not depicted). In other words, a resident heat pipe in a panel can have either one or two external portions available for interfacing with one or two adjacent passive thermal panels.

FIGS. 5C and 5D depict more detail about the interfacing of a resident heat pipe (406) and non-resident heat pipe (508B) via respective cross-sectional and top views of passive thermal system 400.

These figures depict non-resident heat pipe 506B (see, e.g., FIG. 5A) occupying paired channel 408 in passive thermal panel 401. Paired channel 408 (see FIG. 4A, 4B) is sized and located so that when it receives non-resident heat pipe 506B, the non-resident heat pipe abuts resident heat pipe 406. To improve heat transfer between the two heat pipes, as well as to facilitate inserting the non-resident heat pipe into paired channel 408, the exterior of non-resident heat pipe 506B is coated with a non-structural thermal grease/gasket, such as Apiezon H grease, available from M&I Materials, Ltd. of Manchester, UK. Alternatively, a very soft, but high-friction gap filler can be used, such as Thermagon T-pli, available from Laird PLC of London, UK. When using high-friction gap filler, the non-resident heat pipe does not contact the gap filler until the pipe is fully inserted.

In the illustrative embodiment, arrangement 412 for applying a compressive force to non-resident heat pipe 506B comprises a plurality of twist fasteners, each having head 513 and body 514. Referencing FIG. 5C, as head 513 is rotated clockwise, such as via a screwdriver, body 514 moves (or attempts to move) "downward" as a consequence of its arcuate form. This forces non-resident heat pipe 506B "downward" against resident heat pipe 406. Since the resident heat pipe is immobilized in the channel in which it resides, the non-resident heat pipe is forced (i.e., compressed) against the resident heat pipe at the adjacent surfaces thereof. The force applied to non-resident heat pipe 508B ensures that thermal grease/paste 508 between the two "abutting" surfaces of the heat pipes fills any irregularities therein to maximize the contact area therebetween. During operation of the heat pipes, this enhances heat transfer between non-resident and resident heat pipes. Other arrangements for applying compressive force, as will occur to those skilled in the art in light of the present disclosure, may suitably be used.

Figure 7B:
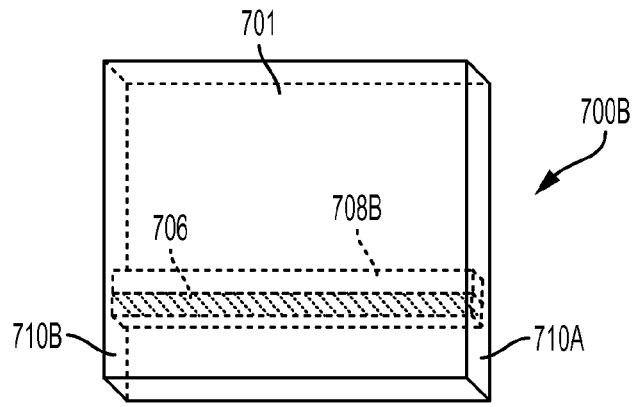
Figure 7C:
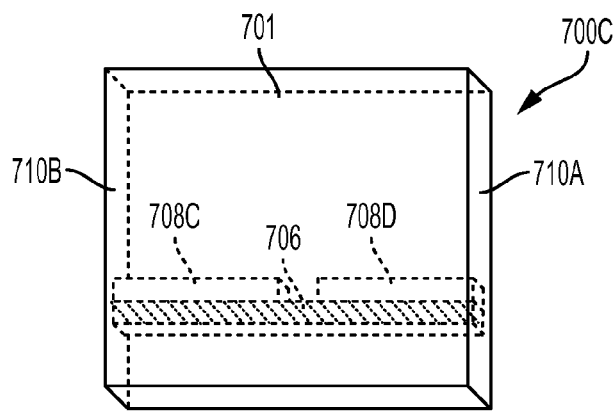

FIGS. 7B through 7C depict several alternative embodiments of a passive thermal system in accordance with the present teachings. In the embodiment depicted in FIG. 7B, paired channel 708B extends the full the length of panel 701. Paired channel 708B is accessible from both of edges 710A and 710B. Thus, paired channel 708B can accept two non-resident heat pipes; one from a passive thermal panel disposed adjacent to edge 710A of panel 701 and a second one from a passive thermal panel disposed adjacent to edge 710B.

In the embodiment depicted in FIG. 7C, two paired channels 708C and 708D, each of which traverses less than one-half of the distance of panel 701 and therefore separate from one another, are formed in panel 701. Paired channel 708C is accessible from edge 710B of panel 701 and channel 708D is accessible from edge 710A.

In some further embodiments, heat pipe 706 depicted in FIGS. 7B and 7C can include a portion that extends beyond the edge of one or both of edges 710A and 710B of panel 701 (e.g., like portion 506B or 506B' in the embodiments of FIGS. 5A and 5B).

In embodiments in which there are multiple resident heat pipes within a passive thermal panel, the paired channel(s) associated with each resident heat pipe can be the same or different from some or all of the other paired channels with the panel.

The most basic implementation of a passive thermal system in accordance with the present teachings will include one passive thermal panel having a resident heat pipe, a paired channel, and an arrangement for applying a compressive force to a non-resident heat pipe. In some other embodiments, a passive thermal system in accordance with the present teachings will include at least two passive thermal panels, at least a first of which panels includes (i) a resident heat pipe, (ii) a paired channel, and (iii) an arrangement for applying a compressive force to a non-resident heat pipe and at least a second of which panels includes (i) a portion of a heat pipe that extends beyond the second panel so that it can be received by the paired channel in the first panel.

It is to be understood that there are many variations of a passive thermal system in accordance with the present teachings, which can vary in the number of passive panels, the configuration of the paired channels and/or heat pipes in the passive panels. Some of the variations include:
(i) for each resident heat pipe, there can be either one or two paired channels;
(ii) a paired channel can extend the full length of a passive thermal panel and be accessible from one or both edges of the passive thermal panel;
(iii) a paired channel can extend a partial length of the passive thermal panel;
(iv) there can be multiple resident heat pipes in a single passive panel;
(v) a passive thermal panel can include a heat pipe that is strictly within the confines of the panel;
(vi) a passive thermal panel can include a heat pipe that includes a portion that is external to the panel;
(vii) a passive thermal panel can include a heat pipe that includes two portions that are external to the panel
(viii) a passive thermal panel can include a heat pipe wherein at least one external portion is co-linear with respect to the portion of the heat pipe within the panel;
(ix) a passive thermal panel can include a heat pipe wherein at least one external portion is not co-linear with respect to the portion of the heat pipe within the panel;
(x) a passive thermal panel can include any combination of the heat pipes of (v) through (ix);
(xi) a single passive thermal panel having any of the configurations indicated in (i) through (x); and
(xii) two or more passive thermal panels individually having any of the configurations indicated in (i) through (x).

It is to be understood that the disclosure describes a few embodiments and that many variations of the invention can easily be devised by those skilled in the art after reading this disclosure and that the scope of the present invention is to be determined by the following claims.

What is claimed:
1. An apparatus comprising a passive thermal system, wherein the passive thermal system comprises:
a first passive thermal panel, the first passive thermal panel having two face sheets and a first core interposing the face sheets;
a first resident heat pipe disposed in the first core;
a second passive thermal panel, the second passive thermal panel having two face sheets and a second core interposing the face sheets of the second passive thermal panel;
a first channel formed in the first core, wherein the first channel is a paired channel because the first channel:
(a) is adjacent to a resident heat pipe, which is the first resident heat pipe, and
(b) is dimensioned and arranged to receive a non-resident heat pipe, the first channel therefore referred to as the first paired channel, wherein the non-resident heat pipe is a first non-resident heat pipe, the first paired channel is accessible from a first edge of the first passive thermal panel, and the non-resident heat pipe is sourced from a second passive thermal panel;
a first arrangement for applying a compressive force to the first non-resident heat pipe when received by the first paired channel; and
a second heat pipe having a first portion and a second portion in fluid communication with one another, a transition between the first portion and the second portion being demarcated by a first edge of the second passive panel, wherein the first portion is disposed in the second core and the second portion is external to the second core and extending from the first edge of the second passive thermal panel.

2. The apparatus of claim 1 wherein the first edge of the first passive thermal panel abuts the first edge of the second passive thermal panel, and wherein the second portion of the second heat pipe is received by the first paired channel, the second portion of the second heat pipe thereby defining the first non-resident heat pipe.

3. The apparatus of claim 1 wherein the first resident heat pipe traverses substantially the full length of the first passive thermal panel.

4. The apparatus of claim 3 wherein the first paired channel traverses less than fifty percent of the length of the first passive thermal panel.

5. The apparatus of claim 2 wherein the first non-resident heat pipe extends along the first resident heat pipe for a distance that is less than fifty percent of the length of the first resident heat pipe.

6. The apparatus of claim 2 further comprising a third passive thermal panel, wherein a second edge of the first passive thermal panel abuts a first edge of the third passive thermal panel, and wherein the first paired channel is also accessible from the second edge of the first passive thermal panel, and further wherein a portion of a third heat pipe extending from the first edge of the third passive thermal panel is received by the first paired channel accessed from the second edge of the first passive thermal panel, the portion of the third heat pipe thereby defining a second non-resident heat pipe received by the first passive thermal panel.

7. An apparatus comprising a passive thermal system, wherein the passive thermal system comprises:
a first passive thermal panel, the first passive thermal panel having two face sheets and a first core interposing the face sheets;
a first resident heat pipe disposed in the first core;
a first channel formed in the first core, wherein the first channel is a paired channel because the first channel;
(a) is adjacent to a resident heat pipe, which is the first resident heat pipe, and
(b) is dimensioned and arranged to receive a non-resident heat pipe, the first channel therefore referred to as the first paired channel, wherein the non-resident heat pipe is a first non-resident heat pipe, the first paired channel is accessible from a first edge of the first passive thermal panel, and the non-resident heat pipe is sourced from a second passive thermal panel;
a first arrangement for applying a compressive force to the first non-resident heat pipe when received by the first paired channel; and
a second paired channel formed in the first core, wherein the second paired channel is adjacent to the first resident heat pipe and co-linear with respect to the first paired channel but spaced apart therefrom, and wherein the second paired channel is accessible from a second edge of the first passive thermal panel and is dimensioned and arranged to receive a second non-resident heat pipe sourced from a third passive thermal panel;

and a second arrangement for applying a compressive force to the second non-resident heat pipe when received by the second paired channel.

8. The apparatus of claim 7 further comprising:
the second passive thermal panel, wherein the first edge of the first passive thermal panel abuts a first edge of the second passive thermal panel having a second heat pipe, a portion of a second heat pipe extending beyond the first edge of the second passive thermal panel, the portion of the second heat pipe received by the first paired channel and being the first non-resident heat pipe; and
a third passive thermal panel, wherein a second edge of the first passive thermal panel abuts a first edge of the third passive thermal panel having a third heat pipe, a portion of a third heat pipe extending beyond the first edge of the third passive thermal panel, the portion of the third heat pipe received by the second first paired channel and being a second non-resident heat pipe received by the first passive thermal panel.

9. The apparatus of claim 1 wherein the first resident heat pipe includes a portion that extends beyond a second edge of the first passive thermal panel.

10. The apparatus of claim 9 further comprising:
the second passive thermal panel, wherein the first edge of the first passive thermal panel abuts a first edge of the second passive thermal panel having a second heat pipe, a portion of a second heat pipe extending beyond the first edge of the second passive thermal panel, the portion of the second heat pipe received by the first paired channel and being the first non-resident heat pipe; and
a third passive thermal panel, a second resident heat pipe disposed in a third core of the third passive panel, a second paired channel formed in the third core, wherein the second paired channel is adjacent to the second resident heat pipe, and wherein the second paired channel is accessible from a first edge of the third passive thermal panel and is dimensioned an arranged to receive a second non-resident heat pipe, and a second arrangement for applying a compressive force to the second non-resident heat pipe when received by the second paired channel, wherein the second edge of the first passive thermal panel abuts the first edge of the third passive thermal panel, the portion of the first heat pipe extending beyond the second edge of the first passive thermal panel being received by the second paired channel and being the second non-resident heat pipe.

11. The apparatus of claim 1 wherein the apparatus comprises an aerospace vehicle.

12. The apparatus of claim 1 wherein the apparatus comprises a satellite.

13. The apparatus of claim 1 further comprising:
a second resident heat pipe disposed in the first core;
a second paired channel formed in the first core, wherein the second paired channel is adjacent to the second resident heat pipe, and wherein the second paired channel is accessible from a first edge of the first passive thermal panel and is dimensioned and arranged to receive a second non-resident heat pipe sourced from the second passive thermal panel; and
a second arrangement for applying a compressive force to the second non-resident heat pipe when received by the second paired channel.

14. A method for forming a passive thermal system, the method comprising:
disposing a resident heat pipe in a core of a nascent first passive thermal panel;
forming a paired channel in the core, the paired channel being adjacent to a resident heat pipe and dimensioned and arranged to receive a non-resident heat pipe sourced wherein the paired channel is accessible from an edge of the first passive thermal panel;
providing a first arrangement for applying a compressive force to the non-resident heat pipe when received by the paired channel; and
abutting and attaching a first face sheet to a first major surface of the core and abutting and attaching a second face sheet to a second major surface of the core, wherein the first arrangement for applying a compressive force is accessible at the first face sheet.

15. The method of claim 14 further comprising:
abutting an edge of a second passive thermal panel against said edge of the first passive thermal panel; and
inserting a portion of a second heat pipe into the paired channel after the first and second face sheets are attached to the core, wherein the portion extends from said edge of the second passive thermal panel, the inserted portion being the non-resident heat pipe received by the first passive thermal panel.

16. The method of claim 14 wherein the paired channel is shorter in length than the resident heat pipe.

* * * * *